Jan. 27, 1931.  W. L. BURNER  1,789,956
DUMP CAR
Filed Feb. 19, 1927  2 Sheets-Sheet 1
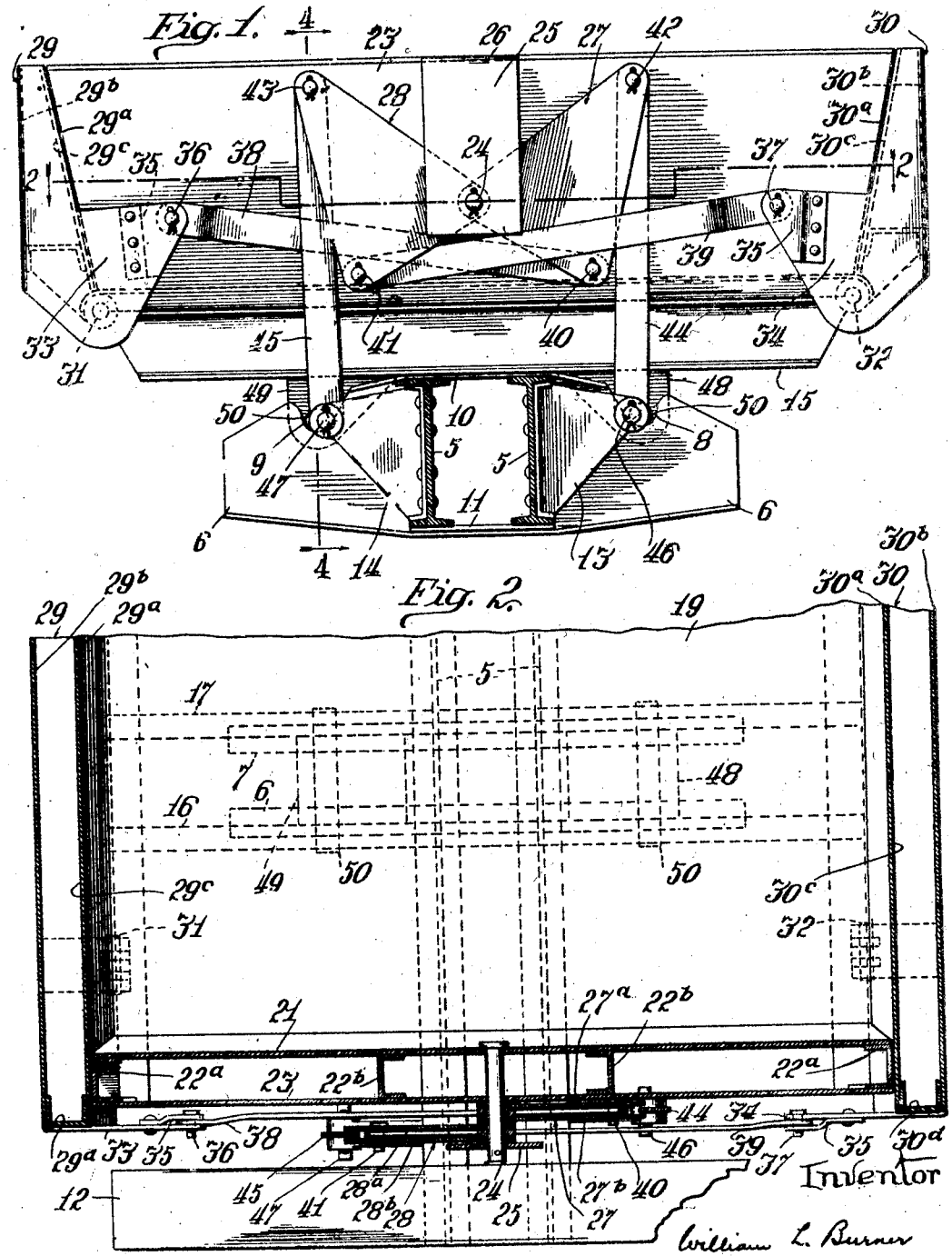

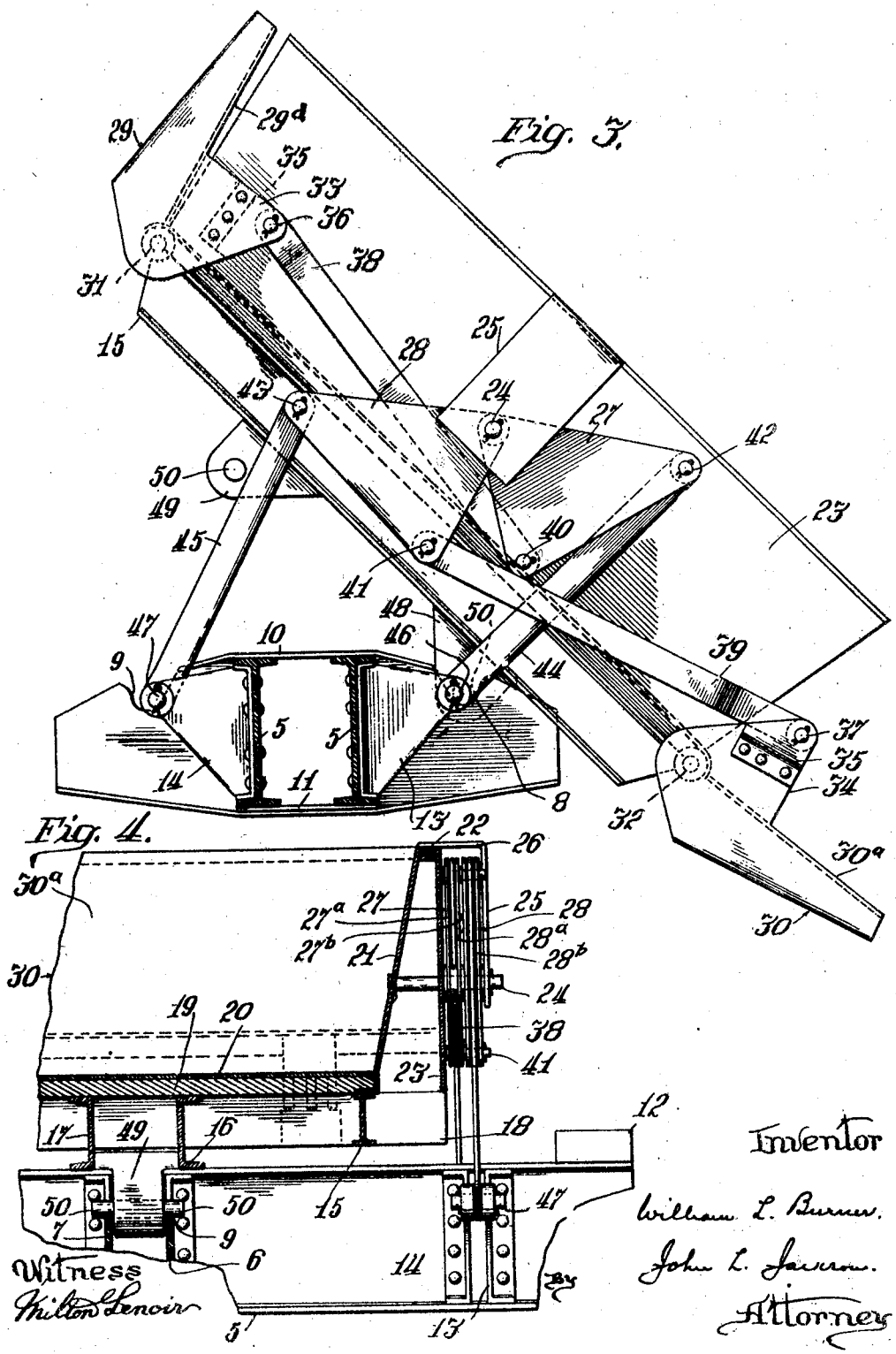

Patented Jan. 27, 1931

1,789,956

UNITED STATES PATENT OFFICE

WILLIAM L. BURNER, OF COLUMBUS, OHIO, ASSIGNOR TO WESTERN WHEELED SCRAPER COMPANY, OF AURORA, ILLINOIS, A CORPORATION OF ILLINOIS

DUMP CAR

Application filed February 19, 1927. Serial No. 169,465.

My invention relates to dumping vehicles and has more especially to do with dump cars, although it may also be applied to vehicles of other kinds.

In the manufacture of dump cars it is customary to mount the body or bed that receives the load on an under body or frame designed to run on a track and be coupled to other cars to make up a train, and it is common practice to mount the bed on the under frame so that it may be tilted in opposite directions from its transport position to discharge its load at either side of the track, the mounting of the bed for this purpose being accomplished in either of several ways. In some cases the bed is mounted to rock about fixed pivots located centrally between the side margins of the bed; in other cases it is mounted on rockers so that when the bed is tilted it moves to a greater or less extent toward the dumping side, and in still other cases the bed is mounted to rock about pivots or fulcra located at opposite sides of the transverse center of the car, the bed rocking about one or the other of said pivots, depending on the direction in which the load is to be dumped.

It is also common practice to provide the beds of dump cars with side gates arranged to be moved out of operative position to permit the discharge of the load, and provided with means by which, when the bed is tilted, the gate at its lower side is moved out of the way while that at the upper side remains in its closed position. Such gates are sometimes arranged to be moved upwardly away from the bed during the dumping operation, and in other cases are hinged to the bed at their lower margins or otherwise mounted so that they may swing downward out of the way, or into position to form a lateral extension of the floor of the bed, during the dumping operation. My present invention relates to dump cars provided with side gates of the latter type, and is applicable to beds mounted on the under body in any of the ways above mentioned, but for the purpose of illustration I have shown it in the drawings as applied to a bed mounted to tilt about fulcra located at opposite sides of the center of the under body. It will be understood, therefore, that except as they are directed to mounting the bed on the under frame in the manner shown, the claims hereinafter made are intended to include mounting the bed in any suitable way so that it may be tilted, preferably in either direction.

In dump cars of this general type it is necessary that the side gates be firmly held in closed position while the load is being transported so that no part of the load will be spilled in transit, and that the gate on the dumping side be opened widely coincidently with the tilting of the bed so that the load may be discharged freely. As above indicated, it has heretofore been the practice during the dumping operation to hold the gate at the high side of the bed tightly closed during the dumping operation, but experience has shown that frequently there is a tendency of the dirt to stick in the high side of the bed when the load is being dumped, so that the bed is not entirely cleared, and this, of course, is objectionable. I have discovered that this objection may be avoided by moving the gate at the high side slightly away from the bed, which tends to loosen any dirt that may stick at that side and cause it to be discharged. To provide means by which this will be accomplished and also to provide improved means for controlling the operation of the gates are the objects of my present invention. These objects I accomplish as illustrated in the drawings and hereinafter described. What I regard as new is set forth in the claims.

In the accompanying drawings,—

Fig. 1 is an end view of part of the under body or frame, the trucks being omitted and the longitudinal center sills being shown in section. In this figure the bed is shown in its transport position with the side gates closed;

Fig. 2 is a partial horizontal section on the line 2—2 of Fig. 1;

Fig. 3 is a view similar to Fig. 1, showing the bed in dumping position; and

Fig. 4 is a partial vertical cross-section on the line 4—4 of Fig. 1.

Referring to the drawings, 5 indicates the longitudinal center sills of the under body, which it should be understood may be of any approved design. In the illustrated construction said center sills carry transverse bolsters, each being in the form of a pair of transversely disposed spaced channel plates 6, 7 provided with concave pockets or bearing 8, 9 at opposite sides of the center sills, which form seats for the pivots or fulcra on which the bed rocks, as will be hereinafter explained. Any suitable number of bolsters may be provided, depending upon the length and capacity of the car. It will be understood, of course, that the under body is provided with the usual trucks.

The center sills are cross connected and braced at top and bottom by plates 10, 11, as best shown in Figs. 1 and 3, and at their ends they preferably support transverse plates or beams 12 that serve as platforms or runways, as shown in Figs. 2 and 4. Also adjacent to their ends they are provided with transversely disposed brackets 13, 14 each preferably made up of spaced plates, best shown in Fig. 4. The purpose of these brackets will be pointed out later.

The load carrying body or bed comprises a series of transverse supports which are secured together by side sills to make up a strong rigid frame on which the other parts of the bed are carried. In the illustrated construction, these transverse supports consist of I-beams 15 located near the ends of the bed, and oppositely disposed channel beams 16, 17 arranged in pairs at intermediate points in the length of the bed, a pair of these channel beams being placed above each pair of bolsters 6, 7. The several transverse supports for the bed are connected by side sills 18, and on said supports rests the floor 19 of the bed. Said floor is preferably covered by a plating 20 to protect the usual wooden floor from wear. The ends of the bed proper are formed by plates 21 that converge downwardly and are firmly secured to the bottom of the bed, the upper ends of said plates being secured to transverse bars 22, which are supported and braced by vertical plates 23, the lower margins of which are firmly attached to the frame of the bed. The end plates 21, 23 are further braced by channel bars $22^a$, $22^b$, the bars $22^a$ forming closures for the end portions of said end plates, as best shown in Fig. 2, while the channel bars $22^b$ serve to brace the intermediate portions thereof.

At the transverse center of each end of the bed is provided a pivot bolt 24 which is preferably located slightly below the vertical center of the bed, the inner end of each pivot being firmly secured to the plates 21, 23, while its outer end extends a short distance beyond the outer face of the plate 23. The outer end of each pivot 24 is further supported by a bracket 25 in the form of a flat plate, the upper end of which is bent at right angles as shown at 26 in Fig. 4 and is secured to the transverse bar 22.

Pivotally mounted on each pivot bolt 24 are two triangular or bell-crank levers 27, 28, said levers being oppositely arranged with respect to each other so that one of them is adapted to extend toward one side of the bed while the other extends toward the opposite side of the bed. These levers are placed between the end plates 23 of the bed and the vertical portions of the brackets 25, and are in offset relation to each other so that in swinging they do not interfere with each other. Preferably each of said levers is composed of two parallel plates spaced apart as shown at $27^a$, $27^b$ and $28^a$, $28^b$ in Fig. 2. These levers are a part of the mechanism for controlling the position of the side gates, as will be hereinafter explained.

At opposite sides of the bed are mounted two side gates 29, 30, pivoted adjacent to their lower margins at 31, 32 respectively to the side margins of the bed so that they may swing downward and outward, as illustrated at the right in Fig. 3. In the illustrated construction the end plates 21, 23 of the bed are shown as provided with inclined end margins or faces, and the side gates are provided with inclined end margins $29^a$, $30^a$, which are adapted to bear squarely against the end faces of the end plates. The side gates are preferably made up of spaced plates $29^b$, $29^c$ and $30^b$, $30^c$, connected at their ends by channel bars $29^d$, $30^d$, as best shown in Fig. 2. At their ends the side gates are provided with inwardly and upwardly extending arms 33, 34, respectively, that extend over and are parallel with the end plates 23 of the bed, each of said arms being preferably provided with a clip 35 to form yokes in which are mounted pivot pins 36, 37, respectively. These pivot pins serve to connect the arms 33, 34 with the outer ends of links 38, 39, respectively, the inner ends of said links being respectively connected by pivot pins 40, 41 with the lower inner corners of the levers 27, 28. The arrangement is such that by swinging said levers transversely the side gates may be swung about their pivots 31, 32 into or out of closed position. The outer or power arms of the levers 27, 28 are connected by pivot pins 42, 43, respectively, with the upper ends of upright bars 44, 45, the lower ends of which are connected, respectively, to the brackets 13, 14 by pivot pins 46, 47. Normally, when the car bed is in its transport position the bars 44, 45 are in approximately vertical positions, as shown in Fig. 1, but when the bed is tilted said bars are swung laterally in one direction or the other, as indicated in Fig. 3. Preferably the several links and bars 38, 39 and 44, 45 are fitted between the two members of the levers to which they are respectively connected, which provides a better balanced connection between said parts and prevents twisting strains. It will be understood that a similar set of controlling devices for the side gates is provided at each end of the car.

In the illustrated construction the car bed is tiltably supported on the under frame by providing it at opposite sides of its transverse center with downwardly extending brackets 48, 49 firmly secured to the frame of the bed and provided with trunnions 50 that are adapted to engage in the pockets or bearings 8, 9 in the members 6, 7 of the bolsters, as best shown in Fig. 4. These trunnions and pockets, therefore, constitute fulcra and fulcra seats therefor on which the car bed may rock when it is tilted in one direction or the other. For example, when the bed is tilted to the right as shown in Fig. 3, the bed rocks about the fulcra seated in the pockets 8 at the right hand portion of the bolster, whereas when the bed is tilted in the opposite direction from its normal position it rocks about the fulcra seated in the pockets 9. The number of brackets 48, 49 corresponds with the number of pockets provided so that the bed is supported at intervals along its length. When it is in its normal position it rests on both fulcra so that it is stably supported on the under frame of the car.

The operation is as follows: When the car bed is in its transport or horizontal position the side gates are closed and the controlling devices occupy the position shown in Fig. 1, the bars 44, 45, being then substantially vertical and the power arms of the levers 27, 28 being swung up toward the upper margins of the ends of the car. The links 38, 39 are then approximately horizontal and the pivot pins 36, 37 that connect the outer ends with the arms 33, 34 of the side gates lie at a considerable distance above the pivots 31, 32 of said gates. I thus provide a great leverage effective to hold the gates closed. When the bed is to be tilted, as for example to discharge its load to the right, the left hand end of the bed is lifted by any suitable mechanism, such as a compressed air operated piston of the character commonly employed for that purpose, and which it has not been deemed necessary to illustrate as devices of that kind are well-known to those familiar with the art. The lifting of the left hand side of the bed carries its fulcra 50 up away from their seats, the bed rocking about the fulcra at the opposite side, and at the same time, the lower ends of the bars 45 being connected to the under frame of the car, the power arms of the levers 28 are swung down actually as well as relatively to the car bed, thereby rocking said levers about the pivots 24 and thrusting outward on the links 39, which swing the side gate 30 downward until it ultimately occupies the position shown in Fig. 3 and becomes in effect a lateral extension of the floor of the bed. This tilting movement of the bed also rocks the bars 44 in the manner illustrated in Fig. 3, which in cooperation with the movement of the bed moves the power arms of the levers 27 downward sufficiently to swing the gate 29 slightly away from the upper side of the bed, as illustrated in Fig. 3. This movement of the upper gate 29 is preferably comparatively slight, but it suffices to loosen any dirt adhering to it and remaining stuck in the upper portion of the bed, so that it will be properly discharged. When the bed is righted the levers 27, 28 are reversely actuated to close the side gates by the time the bed reaches its normal or transport position.

By use of the levers and connections above described I provide increased leverage for opening and closing the side gates so that they are more easily closed and held closed when the bed is in transport position, and better control is maintained of the gates when they are operated in either direction. Obviously, by providing a series of adjustment holes in the triangular levers or in the links and operating bars, or either of such parts, the leverage may be varied, or the connections may be adjusted so that the open position of the gates may be varied. Attention is also directed to the fact that this construction of gate controlling mechanism actually aids in tilting the bed to dumping position, i. e., the pressure of the load on the gate at the dumping side of the car transmits forces to the gate operating linkage which tend to swing the bed up to a dumping position. Such will be evident from the fact that as the bed starts to tilt the load bears with increasing pressure on the gate at the dumping side of the car, and this pressure is transmitted as a tension stress through the link 38 or 39 to the lever 27 or 28. The rotative force established in said lever acts in turn to establish a compression force in the bar 44 or 45, which, reacting against the under body 5, aids in swinging the bed up to its dumping position. While I have shown the triangular bell-crank levers 27, 28 as mounted on the same pivot bolt 24 my invention is not limited to that arrangement, as they can be mounted on separate pivots placed some distance apart to the right and left of the center, but I prefer the arrangement shown. The term central portion of the bed as used in some of the claims is therefore not intended to refer to the exact center, but rather to any suitable position between the side margins thereof.

I have now described the embodiment of my invention shown in the accompanying drawings, but wish it to be understood that the claims hereinafter made are not intended to be restricted to the specific construction shown and described except in so far as details of such construction are particularly included therein.

What I claim as my invention and desire to secure by Letters Patent, is—

1. A dump car comprising an under frame, a tilting bed mounted thereon for lateral tilting movement in either direction about laterally spaced fulcrums and normally supported in stable equilibrium, a side gate connected with the bed to swing into and out of closed position, and means for controlling the swinging of the gate comprising a lever pivotally connected with the bed, means connecting said lever with the gate, and means pivotally connected with said lever and with the under frame and actuated by the tilting of the bed to operate said lever to move the gate relatively to the bed.

2. A dump car comprising an under frame, a tilting bed mounted thereon to tilt downwardly at either side of the under frame, a side gate connected with the bed to swing into and out of closed position, and means for controlling the swinging of the gate comprising a lever pivotally connected with the bed, means connecting said lever with the gate, and means pivotally connected with said lever and with the opposite side of the under frame and actuated by the tilting of the bed to operate said lever to move the gate relatively to the bed.

3. A dump car comprising an under frame, a tilting bed mounted thereon to rock about a fulcrum at one side of the under frame, a side gate connected with the bed to swing into and out of closed position, and means for controlling the swinging of the gate comprising a lever pivotally connected with the bed, means connecting said lever with the gate, and means pivotally connected with said lever and with the opposite side of the under frame and actuated by the tilting of the bed to operate said lever to move the gate relatively to the bed.

4. A dump car comprising an under frame, a tilting bed mounted thereon for lateral dumping to either side, a side gate connected with the bed to fold up against the side of the bed or to fold down away therefrom, and means for controlling the swinging of the gate comprising a lever pivotally connected with the bed, means connecting said elver with the gate, and means pivotally connected with said lever and with the opposite side of the under frame and actuated by the tilting of the bed to operate said lever to move the gate relatively to the bed.

5. A dump car comprising an under frame, a tilting bed mounted on laterally spaced fulcra on said under frame for tilting to either side, a side gate connected with the bed to fold up against the side of the bed or to fold down away therefrom, and means controlling the swnging of the gate comprising a lever pivotally connected with the bed to swing transversely thereof, means connecting said lever with the gate, and means pivotally connected with said lever and with the under frame and actuated by the tilting of the bed to operate said lever to move the gate relatively to the bed.

6. A dump car comprising an under frame, a tilting bed mounted on laterally spaced fulcra on said under frame for dumping to either side, a side gate connected with the bed to swing into and out of closed position, and means for controlling the swinging of the gate comprising a bell-crank lever pivotally connected with the bed, means connecting one of the arms of said lever with the gate, and means pivotally connected with the other arm of said lever and with the under frame and actuated by the tilting of the bed to operate said lever to move the gate relatively to the bed.

7. A dump car comprising an under frame, a tilting bed mounted thereon, a side gate connected with the bed to swing into and out of closed position, and means for controlling the swinging of the gate comprising a bell-crank lever pivotally connected with the bed to swing transversely thereof, means connecting the lower arm of said lever with the gate, and means pivotally connected with the upper arm of said lever and with the under frame and actuated by the tilting of the bed to operate said lever to move the gate relatively to the bed.

8. A dump car comprising an under frame, a tilting bed mounted thereon, a side gate having a hinged connection with the bed adjacent to its lower margin, to swing into and out of closed position, and an arm extending upwardly from said hinge connection, and means for controlling the swinging of the gate comprising a bell-crank lever pivotally connected with the bed to swing transversely thereof, means connecting one of the arms of said lever with the arm carried by the gate, and means pivotally connected with the other arm of said lever and with the under frame and actuated by the tilting of the bed to operate said lever to move the gate relatively to the bed.

9. A dump car comprising an under frame, a tilting bed mounted thereon, a side gate connected with the bed to swing into and out of closed position, and means controlling the swinging of the gate comprising a lever pivotally connected with the bed to swing transversely thereof, means connecting said lever with the gate, and means pivotally connected with said lever and with the under frame at the side thereof opposite to the gate and actuated by the tilting of the bed to operate said lever to move the gate relatively to the bed.

10. A dump car comprising an under frame, a tilting bed mounted thereon, side gates connected with the opposite sides of the bed to swing into and out of closed position, and means for controlling the swinging of said gates comprising levers pivotally connected with the bed, devices respectively connecting one of said levers with one of said gates and the other lever with the other gate, and devices pivotally connected with said levers and with the opposite sides of the under frame and actuated by the tilting of the bed to dump its load at one side or the other of the car to permit the gate at the dumping side to swing away from its closed position.

11. A dump car comprising an under frame, a tilting bed mounted thereon, side gates connected with the opposite sides of the bed to swing into and out of closed position, and means for controlling the swinging of said gates comprising levers pivotally connected with the bed, devices respectively connecting one of said levers with one of said gates and the other lever with the other gate, and devices pivotally connected with said levers and with the under frame and actuated by the tilting of the bed to dump its load at one side or the other of the car to swing the gate at the dumping side away from its closed position and to move the gate at the opposite side to a limited extent away from the bed.

12. A dump car comprising an under frame, a tilting bed mounted thereon, side gates connected with the bed to fold up against the side of the bed or fold down away therefrom, and means controlling the swinging of the gates comprising levers pivotally connected with the bed to swing transversely thereof, devices respectively connecting one of said levers with the gate at one side of the bed and the other lever with the gate at the other side of the bed, and means pivotally connected with said levers and with the under frame and actuated by the tilting of the bed to dump its load at one side or the other of the car to permit the gate at the dumping side to move away from its closed position.

13. A dump car comprising an under frame, a tilting bed mounted thereon, side gates connected with the bed to fold up against the side of the bed or fold down away therefrom, and means controlling the swinging of the gates comprising levers pivotally connected with the bed to swing transversely thereof, devices respectively connecting one of said levers with the gate at one side of the bed and the other lever with the gate at the other side of the bed, and means pivotally connected with said levers and with the under frame and actuated by the tilting of the bed to dump its load at one side or the other of the car to move the gate at the dumping side away from its closed position, and to move the opposite gate slightly away from the bed.

14. A dump car comprising an under frame, a tilting bed mounted thereon, side gates having hinge connections with the bed at their lower margins, to swing up or down, into or out of closed position, and means for controlling the swinging of the gates comprising bell-crank levers pivotally connected with the central portion of the bed to swing transversely thereof, links connecting one of the arms of said levers respectively with said gates, and bars connecting the other arms of said levers respectively with the under frame and actuated by the tilting of the bed to dump its load at one side or the other of the car to permit the gate to open at the dumping side.

15. A dump car comprising an under frame, a tilting bed mounted thereon, side gates having hinge connections with the bed at their lower margins, to swing up or down, into or out of closed position, and means for controlling the swinging of the gates comprising bell-crank levers pivotally connected with the central portion of the bed to swing transversely thereof, links connecting one of the arms of said levers respectively with said gates, and bars connecting the other arms of said levers respectively with the under frame and actuated by the tilting of the bed to dump its load at one side or the other of the car to open the gate at the dumping side, and to move the gate at the opposite side slightly away from the bed.

16. A dump car comprising an under frame, a tilting bed mounted thereon, side gates having hinge connections with the bed at their lower margins, to swing up or down, into or out of closed position, and means for controlling the swinging of the gates comprising bell-crank levers pivotally connected with the central portion of the bed to swing transversely thereof, links connecting one of the arms of said levers respectively with said gates, and bars connecting the other arms of said levers with the under frame at opposite sides of the center thereof, and actuated by the tilting of the bed to dump its load at one side or the other of the car to permit the gate to open at the dumping side.

17. A dump car comprising an under frame, a tilting bed mounted thereon, side gates connected with the bed at opposite sides thereof to swing up into closed position or down into dumping position, and means actuated by the tilting of the bed to dump its load at one side of the car to move the gate at the dumping side down away from the bed and to move the gate at the opposite side of the bed slightly away from the bed, said devices serving to hold both gates closed when the bed is in transport position.

18. A dump car comprising an under frame, a tilting bed mounted thereon, side gates hinged to the bed adjacent to their lower margins to swing up into closed position or down away from the bed, and means for controlling the swinging of the gates comprising lever mechanism pivotally mounted on the bed, means pivotally connecting said lever mechanism with said gates at points above the hinges thereof, and means actuated by the tilting of the bed to dump its load at one side or the other of the car to permit the gate to open at the dumping side.

19. A dump car comprising an under frame, a tilting bed mounted thereon, side gates hinged to the bed adjacent to their lower margins to swing up into closed position or down away from the bed, and means for controlling the swinging of the gates comprising lever mechanism pivotally mounted on the bed and connected with said gates at points above the hinges thereof, and means actuated by the tilting of the bed to dump its load at one side or the other of the car to open the gate at the dumping side, and to move the gate at the opposite side slightly away from the bed.

20. A dump car comprising an under frame, a tilting bed mounted thereon for lateral tilting movement in either direction about laterally spaced fulcrums, a side gate for said bed mounted to swing outward and downward from its closed position, and means operatively connected with said gate and arranged whereby the pressure of the load acting against said gate is effective to aid in tilting the bed to dumping position.

21. A dump car comprising an under frame, a tilting bed mounted thereon to rock about a fulcrum at one side of the under frame, a side gate pivotally connected adjacent to its lower edge to said bed to swing outwardly and downwardly from its closed position, and mechanism pivotally connected with said gate and with the opposite side of said under frame, arranged whereby the pressure of the load acting outwardly on the gate in the initiation of the dumping movement aids in tilting the bed to dumping position.

22. A dump car comprising an under frame, a tilting bed mounted thereon, side gates for said bed mounted to swing outward and downward from their closed position, and motion transmitting mechanism for controlling the swinging of said gates, arranged whereby the pressure of the load acting outwardly on the gate at the dumping side of the bed reacts as a compression force between the rising side of the bed and the under frame to aid in tilting the bed to dumping position.

23. A dump car comprising an under frame, a tilting bed mounted thereon for lateral tilting movement in either direction, side gates for said bed mounted to swing outward and downward from their closed position, controlling mechanism for each gate comprising a lever pivotally supported on the bed, a link connected between said lever and the under frame, and a second link pivotally connected at one end with said lever and at its other end with its associated gate at a point above the hinge of said gate.

24. A dump car comprising an under frame, a tilting bed mounted thereon for lateral tilting movement in either direction about laterally spaced fulcrums, side gates for said bed mounted to swing outward and downward from their closed position and gate controlling mechanism operatively connected between each gate and said under frame and comprising a motion transmitting link operating solely under tension during the opening and closing movements of said gates.

25. A dump car comprising an under frame, a tilting bed mounted thereon for lateral tilting movement in either direction about laterally spaced fulcrums and normally supported in stable equilibrium, a side gate connected with the bed to swing into and out of closed position, and means for controlling the swinging of the gate comprising a lever pivotally connected with the bed, means connecting said lever with the gate at a point above the hinge axis of the gate, and means pivotally connected with said lever and with the under frame and actuated by the tilting of the bed to operate said lever to move the gate relatively to the bed.

26. A dump car comprising an under frame, a tilting bed mounted thereon to tilt downwardly at either side of the under frame, a side gate connected with the bed to swing into and out of closed position, and means for controlling the swinging of the gate comprising a lever pivotally connected with the bed, means connecting said lever with the gate at a point above the hinge axis of said gate, and means pivotally connected with said lever and with the opposite side of the under frame and actuated by the tilting of the bed to operate said lever to move the gate relatively to the bed.

27. A dump car comprising an under frame, a tilting bed mounted thereon for lateral tilting movement in either direction about laterally spaced fulcrums and normally supported in stable equilibrium, a side gate connected with the bed to swing into and out of closed position, and means for controlling the swinging of the gate comprising a lever pivotally connected with the bed, means connecting said lever with the gate at a point above the hinge axis of the gate, and means pivotally connected with said lever and with the opposite side of the under frame and actuated by the tilting of the bed to operate said lever to move the gate relatively to the bed.

28. A dump car comprising an under frame, a tilting bed mounted thereon for lateral tilting movement in either direction about laterally spaced fulcrums, a side gate for said bed mounted to swing outward and downward from its closed position, and means operatively connected with said gate at a point above the hinge axis of the gate and arranged whereby the pressure of the load acting against said gate is effective to aid in tilting the bed to dumping position.

29. A dump car comprising an under frame, a tilting bed mounted thereon to rock about a fulcrum at one side of the under frame, a side gate pivotally connected adjacent to its lower edge to said bed to swing outwardly and downwardly from its closed position, and mechanism pivotally connected with said gate at a point above the pivotal connection of the gate with the bed and with the opposite side of said under frame, arranged whereby the pressure of the load acting outwardly on the gate in the initiation of the dumping movement aids in tilting the bed to dumping position.

30. A dump car comprising an under frame, a tilting bed mounted thereon for lateral tilting movement in either direction about laterally spaced fulcrums, a side gate for said bed mounted to swing outward and downward from its closed position, and means for controlling said gate, including a link connected to said gate at a point above the hinge axis of the gate.

31. A dump car comprising an under frame, a tilting bed mounted thereon for lateral tilting movement in either direction about laterally spaced fulcrums, a side gate for said bed mounted to swing outward and downward from its closed position, and gate controlling mechanism comprising a lever mounted upon said bed, a link connecting said lever with said gate at a point above the hinge axis of said gate, and means carried by the opposite end of said lever and actuated by the tilting of said bed for operating said lever to move said gate relatively to said bed.

32. A dump car comprising an under frame, a tilting bed mounted thereon for lateral tilting movement in either direction about laterally spaced fulcrums, a side gate for said bed mounted to swing outward and downward from its closed position, and means for controlling said gate, including a link operating solely under tension and connected to said gate at a point above the hinge axis of the gate.

33. A dump car comprising an under body, a tilting bed mounted thereon for dumping to either side of said under body, a side gate for said bed mounted to swing outward and downward from its closed position, and means for controlling the operation of said gate including a substantially vertically disposed link arranged whereby the load acting outwardly upon said gate reacts to establish a compression force in said link to aid in tilting the bed to dumping position.

34. A dump car comprising an under frame, a tilting bed mounted thereon for dumping to either side of said under frame, a side gate for said bed mounted to swing outward and downward from its closed position, means for controlling the operation of said gate comprising a lever fulcrumed on said bed, an operative connection between said lever and said gate, and means connecting said lever with said under frame and arranged whereby the load acting outwardly on said gate reacts as a compression force on said last named means to aid in tilting the bed to dumping position.

35. A dump car comprising an under frame, a tilting bed mounted thereon for dumping to either side of said under frame, a side gate for said bed mounted to swing outward and downward from its closed position, means for controlling the operation of said gate comprising a lever fulcrumed on said bed, an operative connection between said lever and said gate operating solely under tension, and means connecting said lever with said under frame and arranged whereby the load acting outwardly on said gate reacts as a compression force on said last named means to aid in tilting the bed to dumping position.

36. A dump car comprising an under frame, a tilting bed mounted thereon for dumping to either side of said under frame, a side gate for said bed mounted to swing outward and downward from its closed position, gate controlling mechanism comprising a link connected with said gate and operating solely under tension, and means connecting said link with the under frame and arranged whereby the load acting outwardly on said gate reacts as a compression force on said last named means to aid in tilting the bed to dumping position.

37. A dump car comprising an under frame, a tilting bed mounted thereon for dumping to either side of said under frame, a side gate for said bed mounted to swing outward and downward from its closed position, gate controlling mechanism comprising a bell crank lever fulcrumed on said body, a tension member connecting one end of said lever with said gate, and a compression member connecting the other end of said lever with said under frame whereby the pressure of the load on said gate will aid in tilting the bed to dumping position.

38. In a dump car comprising an under frame, a tilting bed mounted thereon for lateral tilting movement in either direction about laterally spaced fulcrums, side gates for said bed mounted to swing outward and downward from their closed position, and gate controlling mechanism mounted on said bed above the plane of the load carrying surface thereof and actuated by the tilting of the bed to move said gates relatively to said bed.

39. In a dump car comprising an under frame, a tilting bed mounted thereon for lateral tilting movement in either direction about laterally spaced fulcrums, side gates for said bed mounted to swing outward and downward from their closed position, and gate controlling mechanism mounted on opposite ends of said bed above the plane of the load carrying surface thereof and actuated by the tilting of the bed to move said gates relatively to said bed.

40. In a dump car comprising an under frame, a tilting bed mounted thereon for lateral tilting movement in either direction about laterally spaced fulcrums, side gates for said bed mounted to swing outward and downward from their closed position, and means for controlling the swinging of said gates mounted on opposite ends of said bed above the plane of the load carrying surface thereof and being connected to said under frame whereby upon tilting of said bed the gate at the dumping side of the bed will be permitted to move to open position.

41. In a dump car comprising an under frame, a tilting bed mounted thereon for lateral tilting movement in either direction about laterally spaced fulcrums, side gates for said bed mounted to swing outward and downward from their closed position, and gate controlling mechanism comprising a lever mounted on said bed above the plane of the load carrying surface thereof, means connecting said lever with said gates, and means pivotally connected with said lever and with the under frame and actuated by the lateral movement of the bed relatively to said under frame to operate said lever to move the gates relatively to the bed.

42. In a dump car comprising an under frame, a tilting bed mounted thereon for lateral tilting movement in either direction about laterally spaced fulcrums, side gates for said bed mounted to swing outward and downward from their closed position, gate controlling mechanism comprising a lever mounted on said bed above the load carrying surface thereof, means connecting said lever with one of said gates at a point above the hinge axis of the gate and means pivotally connected with said lever and with the opposite side of the underframe and actuated by the tilting of the bed to operate said lever to permit said gate to move relatively to the bed.

43. In a dump car comprising an under frame, a tilting bed mounted thereon for lateral tilting movement in either direction about laterally spaced fulcrums, side gates for said bed mounted to swing outward and downward from their closed position, and gate controlling mechanism mounted on opposite ends of said bed above the plane of the load carrying surface thereof and including a link connected to said gate at a point above the hinge axis of the gate for swinging said gate relatively to said bed upon tilting movement thereof in either direction.

44. A dump car comprising an under frame, a tilting bed mounted thereon for lateral tilting movement in either direction about laterally spaced fulcrums, side gates for said bed mounted to swing outward and downward from their closed position, gate controlling mechanism comprising a lever mounted on said bed above the plane of the load carrying surface thereof and operative to transmit closing movement to one of said gates, and means pivotally connected with said lever and with the opposite side of the under frame and actuated by the tilting of the bed to operate said lever to permit the associated gate to move relatively to the bed.

45. A dump car comprising an under frame, a tilting bed mounted thereon for lateral tilting movement in either direction about laterally spaced fulcrums, side gates for said bed mounted to swing outward and downward from their closed position, gate controlling mechanism comprising levers mounted on opposite ends of said bed above the load carrying surface thereof, operative connections between said levers and said gates, and means pivotally connected with said levers and with the under frame and actuated by the lateral movement of the bed relatively to the under frame to operate said levers to move the gates relatively to the bed.

WILLIAM L. BURNER.